(12) United States Patent
Landmann (10) Patent No.: US 6,776,251 B2
(45) Date of Patent: Aug. 17, 2004

(54) DEVICE FOR LOCKING A STEERING COLUMN OF A VEHICLE

(75) Inventor: Alfred Landmann, Maisach-Überacker (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 134 days.

(21) Appl. No.: 10/077,186

(22) Filed: Feb. 15, 2002

(65) Prior Publication Data

US 2002/0117841 A1 Aug. 29, 2002

(30) Foreign Application Priority Data

Feb. 23, 2001 (DE) ..................................... 201 03 203 U (51) Int. Cl.[7] .............................. B62D 1/16; B60R 25/02
(52) U.S. Cl. ......................... 180/287; 70/252; 74/492; 74/495
(58) Field of Search .................. 74/492, 495; 180/287; 70/252

(56) References Cited

U.S. PATENT DOCUMENTS 1,363,285 A * 12/1920 Stabler .......................... 70/185
5,921,355 A    7/1999 Mostrom
6,000,489 A * 12/1999 Rick ........................... 180/287
6,298,938 B1 * 10/2001 Klaiber et al. .............. 180/287
6,501,370 B1 * 12/2002 Rick ........................ 340/425.5

FOREIGN PATENT DOCUMENTS

| DE | 199 24 835 A1 |   | 12/2000 |
|----|---------------|---|---------|
| DE | 199 29 435 A1 |   | 1/2001  |
| EP | 0 268 879 A1  | * | 11/1987 |
| GB | 2 298 837 A   | * | 9/1996  |

* cited by examiner

*Primary Examiner*—Ruth Iian
(74) *Attorney, Agent, or Firm*—Friedrich Kueffner (57) ABSTRACT

A device for locking a steering column of a vehicle has a force-loaded locking member and a control device for adjusting the locking member relative to the steering column between a locking position preventing rotation of the steering column and a release position allowing rotation of the steering column. The locking member has one or more clamping jaws having a smooth friction surface without profile. A smooth counter friction surface without profile is provided on the circumference of the steering column. A force generator is connected to the control device and exerts in a locking situation, where the locking member is in the locking position, a clamping force onto the locking member directed against the counter friction surface and turns off the clamping force in a release situation, where the locking member is in the release position.

19 Claims, 9 Drawing Sheets

DEVICE FOR LOCKING A STEERING COLUMN OF A VEHICLE

BACKGROUND OF THE INVENTION

1. Field of the Invention

The invention relates to a device for locking the steering column of a vehicle as needed, comprising a force-loaded locking member, and comprising a control device which adjusts the locking member relative to the steering column between two positions, that is, a locking position in which the rotation of the steering column is prevented and a release position in which a rotation is possible.

2. Description of the Related Art

In the known device of this kind the locking member is comprised of a profiled bolt which in the locking position of the device is introduced by a motor into a crown gear (DE 199 24 835 A1) or into a hollow profiled section (DE 199 29 435 A1) of the steering column.

In the aforementioned device the bolt is movable together with a lifting member driven by a motor, and an interposed spring loads the bolt in the ejection direction. Moreover, a restoring force constantly acts on the lifting member and attempts to push the bolt against the hollow profiled section of the steering column. In the locking position the bolt can engage the steering column only in certain rotational positions while locking is not possible in the other rotational positions. On the other hand, upon movement into the release position the removal of the bolt from the hollow profiled section can be difficult. This happens, for example, when the steering column, while in the locked position, has been rotated by the amount of play that is available and this rotation is fixed because the wheels of the vehicle are pushed against the curb.

SUMMARY OF THE INVENTION

It is an object of the present invention to develop a simple, reliable device of the aforementioned kind with which the aforementioned disadvantages can be prevented.

In accordance with the present invention, this is achieved in that the locking member is comprised of at least one clamping jaw which has a substantially smooth friction surface without surface profile (pattern), in that on the circumference of the steering column a substantially smooth counter friction surface without surface profile (pattern) is provided, and in that the control device acts on a force generator which in the locking situation exerts a clamping force onto the clamping jaw directed against the counter friction surface, but turns off this clamping force in the release position.

The invention thus avoids a positive-locking engagement between the locking member and the steering column and provides instead a frictional locking position between the friction surface of a clamping jaw and a counter friction surface of the steering column. In this way, immediately in any of the rotational positions of the steering column, a reliable locking position is possible, and, moreover, the movement into the release position is possible always without disturbances. This is made possible by a force generator which exerts a clamping force onto the clamping jaw in the locking position and thus forces its friction surface against the counter friction surface of the steering column. In the release position, on the other hand, the clamping force is switched off and the friction surface is released relative to the counter friction surface. A minimal travel is sufficient between the locking position and the release position of the clamping jaw. The air gap must be only tenths or hundredths of a millimeter in the release position.

A clamping jaw can surround half the circumferential area of the steering column. This areal contact provides a high clamping force load and results in an excellent steering column guiding action. This can be improved when the oppositely positioned circumferential area of the steering column is covered by a mirror-symmetrically arranged additional clamping jaw. In this way, the device, in particular, when it is configured as a mirror-symmetrical clamping jaw pair, can take over the function of a rotational bearing for the steering column. In this way, it is possible with the invention to eliminate an otherwise required bearing for the steering column.

For increasing the clamping force, the clamping jaw or the clamping jaws can be comprised of several segments which are movable segment by segment radially toward the steering column axis. Wedge profiles on the counter segments and, optionally, counter wedge profiles provided on the moveable control members generating the clamping force can generate a set of clamping forces acting segment-by-segment which are oriented toward one another in a radially staggered arrangement. Such a control member can be comprised of a clamping ring which in the locking situation engages the locking members and effects the required radial pressing action of the individual segments.

Because a positive-locking engagement is avoided, the movement between the locking position and the release position, and vice versa, occurs completely silently. Because of the minimal adjustment stroke of the clamping jaw or the clamping jaws or its/their segments and because of the clamping force or release force being generated only as needed, small-size drives are sufficient which are not only inexpensive but also space-saving. This is so particularly because of the wedge drives for generating the clamping force or the release force to be described in the following.

In particular, when a clamping jaw pair is configured as a constructive unit in the form of a clamp surrounding the steering column and secured against rotation, there is also a theft protection provided for the vehicle furnished with this device. Removing the clamping sleeve from the device housing has no effect in the locking situation because the clamp loaded by the clamping force prevents a rotation of the steering column even in the demounted state of the clamping sleeve. Accordingly, in the device according to the invention no special provisions are required in order to make the access to the clamping jaw or the clamp difficult or to prevent its demounting. Eliminating such safety measures saves space as well as manufacturing and assembly costs.

DESCRIPTION OF THE PREFERRED EMBODIMENTS

Figure 1:
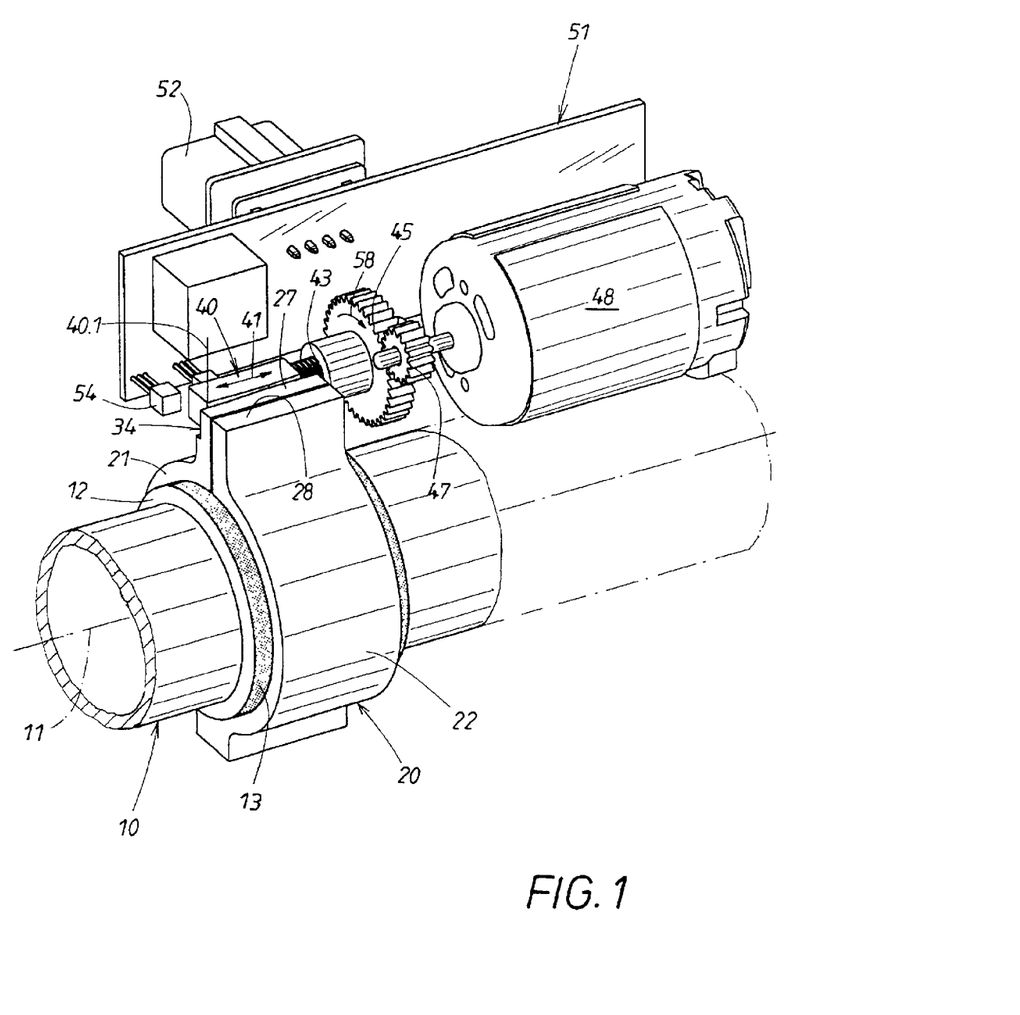
FIG. 1 shows in a perspective illustration, with the housing being open, the most important components of the invention in the locking situation of the device.

The device is provided for locking a steering column 10 as needed, wherein the axis 11 of the steering column 10 is indicated in dash-dotted lines in FIG. 1. A defined section of the steering column 10 is provided with a collar 12 which is fixedly connected to the column 10 and whose cylindrical circumferential surface acts as a counter friction surface 13 interacting with friction surfaces 23 still to be described.

Figure 3:
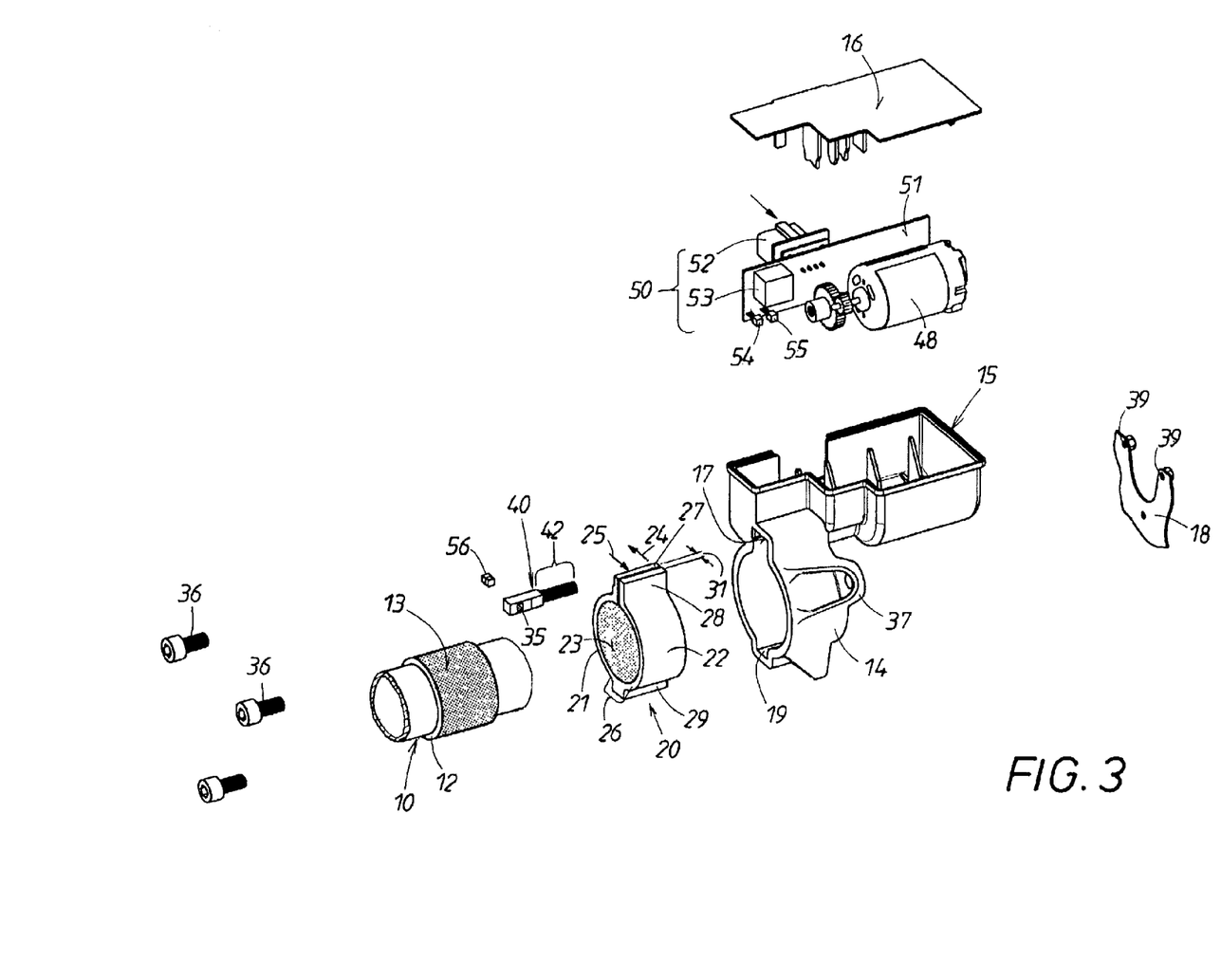
FIG. 3 shows on a smaller scale relative to FIGS. 1 and 2 an exploded view of the components of the device according to the invention before their assembly.

A clamp 20, illustrated in FIG. 3, is placed about the counter friction surface 13. The two legs of the clamp 20 form two clamping jaws 21, 22 moveable in opposite directions as indicated by the two arrows 24 and 25. At the apex between the two legs, a bending point 26 is provided which has the tendency to push the two clamping jaws 21, 22 apart in the direction of the aforementioned arrow 24. This results in a release force, indicated in FIG. 5 by a force arrow 30, between the two clamping jaws which generates a large gap 31, shown in FIG. 5, between the two end flanges 27, 28 located where the two clamp legs end.

Figure 2:
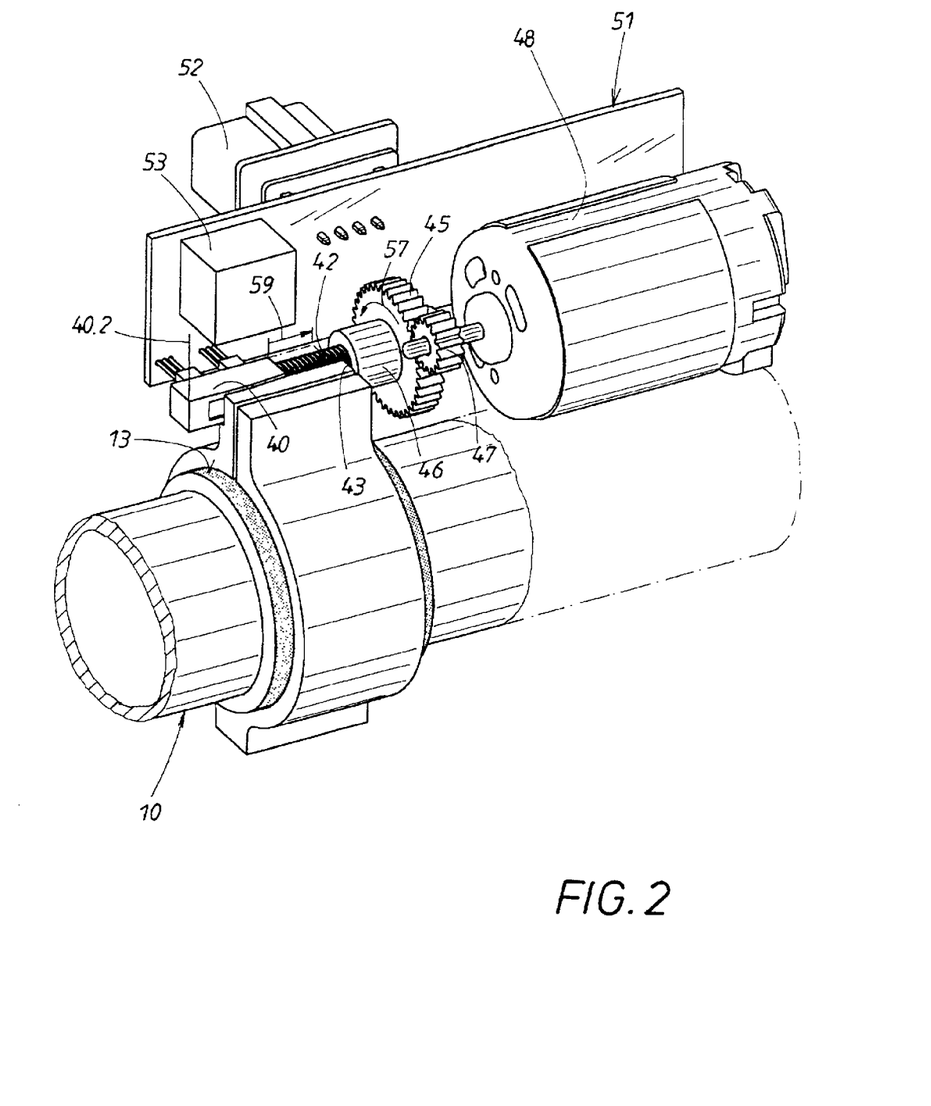
FIG. 2 shows in the same illustration as in FIG. 1 the release position of the components.
Figure 5:
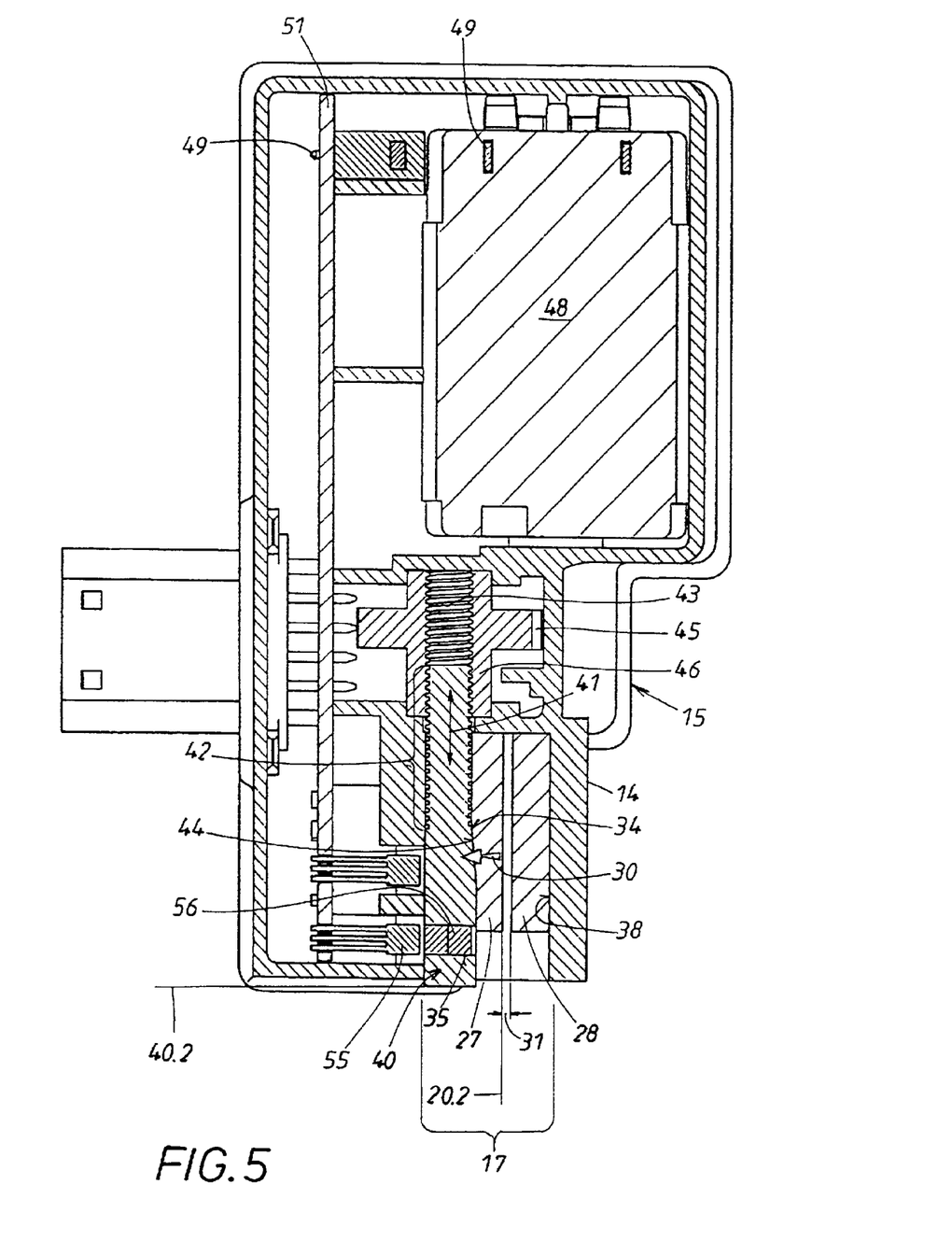
FIG. 5 shows in a representation analog to FIG. 4 the release position of the device, as already shown in FIG. 2.
Figure 6:
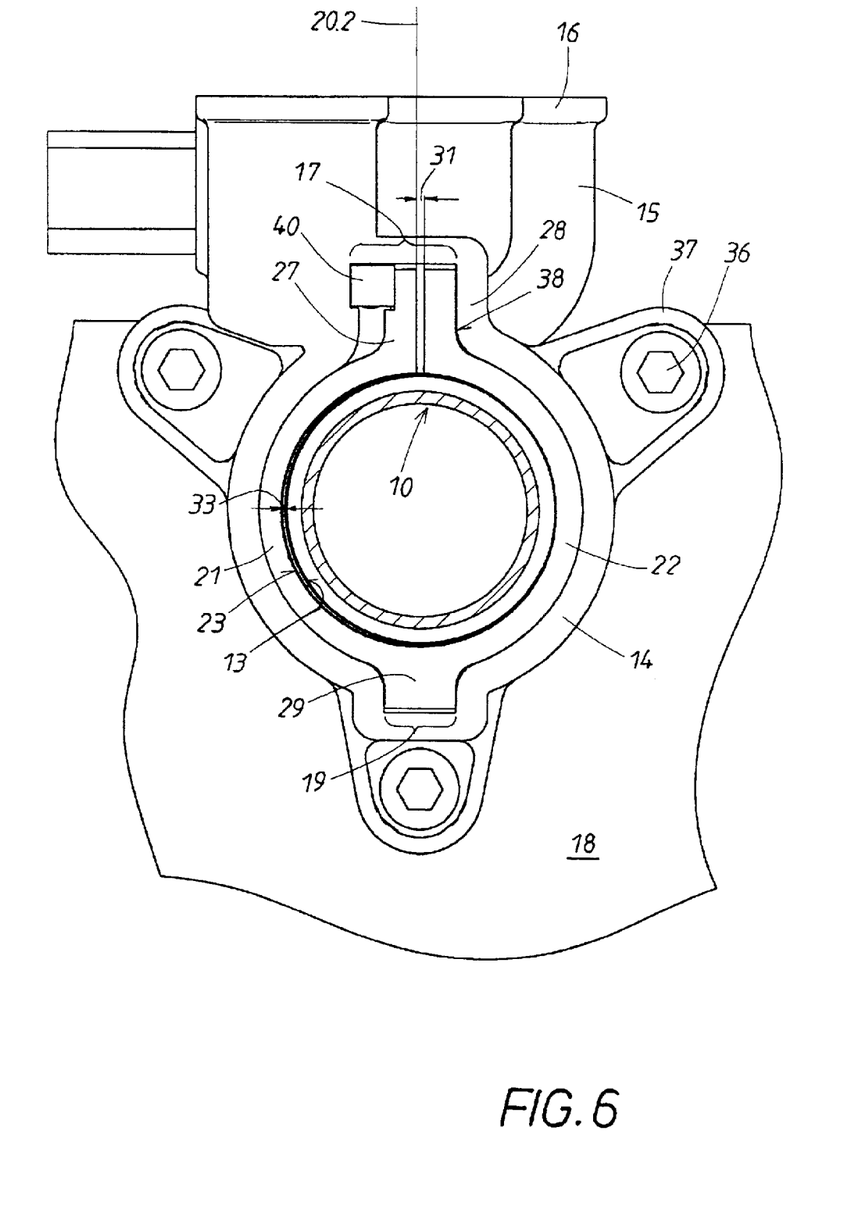
FIG. 6 shows on an enlarged scale an end view onto the device with a radial sectional view of the steering column in the release situation.

As illustrated in FIG. 3, the inner surface of the clamp 20 acts as a friction surface 23. The release position is illustrated in FIGS. 2, 5, and 6. As illustrated in FIG. 6, between the friction and counter friction surfaces 23, 13 an air gap 33 is provided which needs to be only a few tenths or even hundredths of a millimeter. The clamp 20 positioned about the counter friction surface 13 of the steering column 10 is arranged in a bushing attachment 14 which belongs to a housing comprised of a receptacle 15 and a lid 16. As shown in FIG. 3, the bushing attachment 14 has matching axial channels 17, 19, and one channel 17 receives the radial end flanges 27, 28 provided on the ends of the legs while a radial rib 29 provided for reinforcing the bending point 26 is positive-lockingly introduced into the other channel 19. The positive-locking connection in the mounted situation is illustrated best in FIG. 6. The housing comprised of the parts 14, 15, 16, as illustrated in FIG. 6, is fastened on a console 18 in the vehicle. This is realized by means of screws 38 which extend through penetrations in projecting brackets 37 of the bushing attachment 14, as illustrated in FIG. 3, and engage nuts 39 of the console 18. The non-round portions of the clamp 20, e.g., the aforementioned radial end flanges 27, 28 and the rib 29, can have matching shoulders correlated therewith in the area of the support 18. In this case, even after removing the screws 36, an unauthorized rotation of the steering column in the locking situation to be described in more detail in the following is excluded. This improves the theft protection.

In the aforementioned FIGS. 2, 5, and 6 the release position of the clamp 20 is shown. In the illustrated embodiment the two clamping jaws 21, 22 are embodied substantially mirror-symmetrically identical to one another but they act with adjoining components in different ways. One clamping jaw 22 is supported with its end flange 28 on a radial shoulder 38 of the bushing attachment 14 of the housing 15, 16 so that this clamping jaw 22 is referred to as the "stationary jaw". This radial shoulder 38 can be formed by the lateral wall of the channel 17 illustrated in FIG. 6.

The other jaw 21, on the other hand, can be radially spread as indicated by the aforementioned arrows 24, 25 of FIG. 3. For this purpose, the aforementioned axial channel 17 is of such a width that not only the end flange 27 can be lifted (24) off and, in the opposite direction, pressed against (25) the clamping jaw 22, but that also a control member 40 required for these actions can be received in the axial channel 17. This control member in the present case is comprised of a wedge 40 which is longitudinally movable in the direction of the arrow 41 illustrated in FIGS. 1 and 5. The wedge 40 has a wedge surface 44 which cooperates with a counter wedge surface 34 provided on the outer flank of the end flange 27. In FIG. 5 the wedge surface 44 and the counter wedge surface 34 are staggered axially relative to one another. The wedge 40 is then positioned in an "inactive position" characterized by the axial auxiliary line 40.2. The two clamping jaws 21, 22 are moved apart at maximum spacing as a result of the aforementioned release force 30 inherent in the configuration. Their friction surfaces 23 release the steering column 10. One boundary of the resulting large gap 31 between the two radial jaw flanges 27, 28 is marked with an auxiliary line 20.2 in FIG. 5 and in FIG. 6. This auxiliary line characterizes the aforementioned "release position" of the clamp 20.

Figure 7:
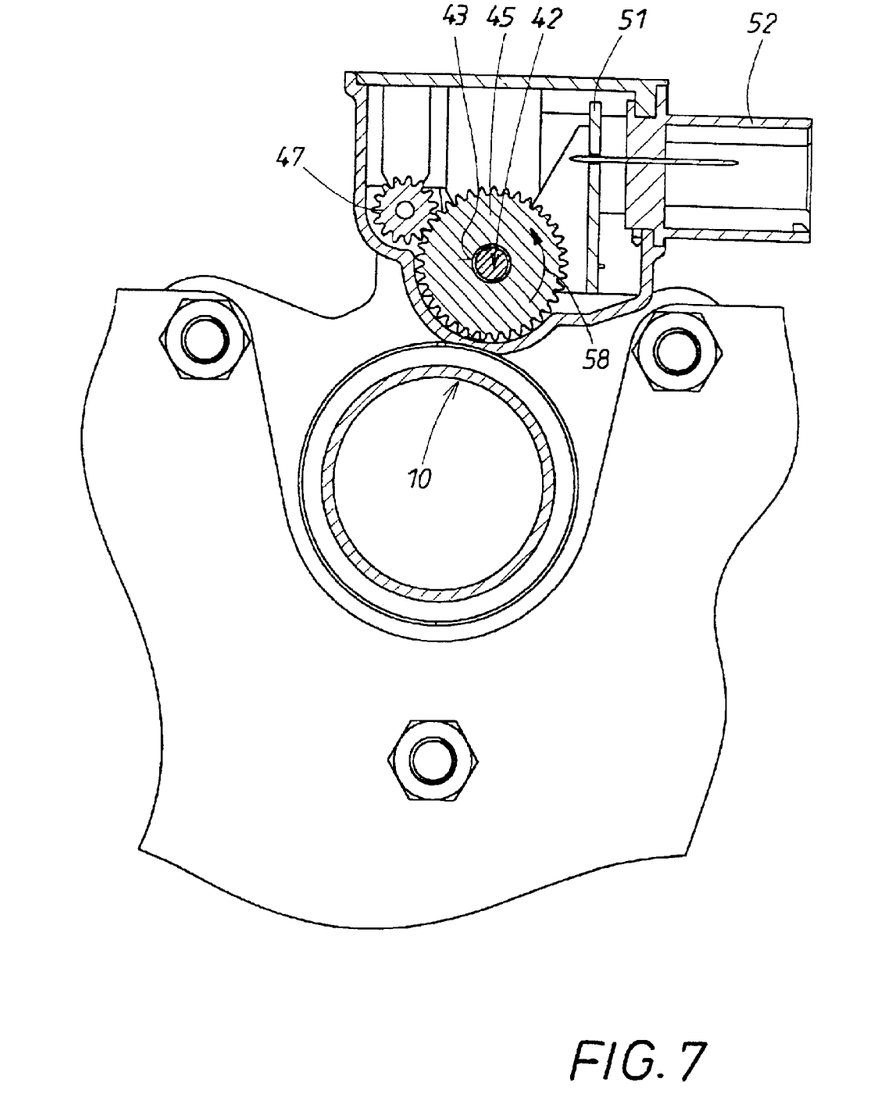
FIG. 7 the view onto a further radial section of the device according to the invention along the section line VII—VII of FIG. 4.

The longitudinal movement 41 of the wedge 40 is realized in a special way. As can be seen in FIG. 1, the longitudinal movement 41 of the wedge 40 is parallel to the axis of the steering column axis 11. This provides a space-saving axis-parallel arrangement of the correlated drive means which are arranged in the housing 15, 16. The wedge 40 itself is provided with a drive means in the form of a threaded member which engages a threaded receptacle 43. The threaded receptacle 43 is positioned in the hub 46 of a gear wheel 45. As can be seen particularly well in FIG. 7, the gear wheel 45 meshes with a pinion 47 which belongs to an electric motor 48 or the like best seen in FIG. 2. The electric motor 48 is driven by a control device 50 whose elements are partially located external to the illustrated device and partially on a printed circuit board 51 arranged in the housing 15, 16. The external components are connected by means of a plug with an electrical coupling 52 placed on the circuit board 51. Various electronic components are connected to the printed conductors of the circuit board 51, wherein only a relay 53 is illustrated in the embodiment of FIG. 2 as an example of such components.

Figure 8:
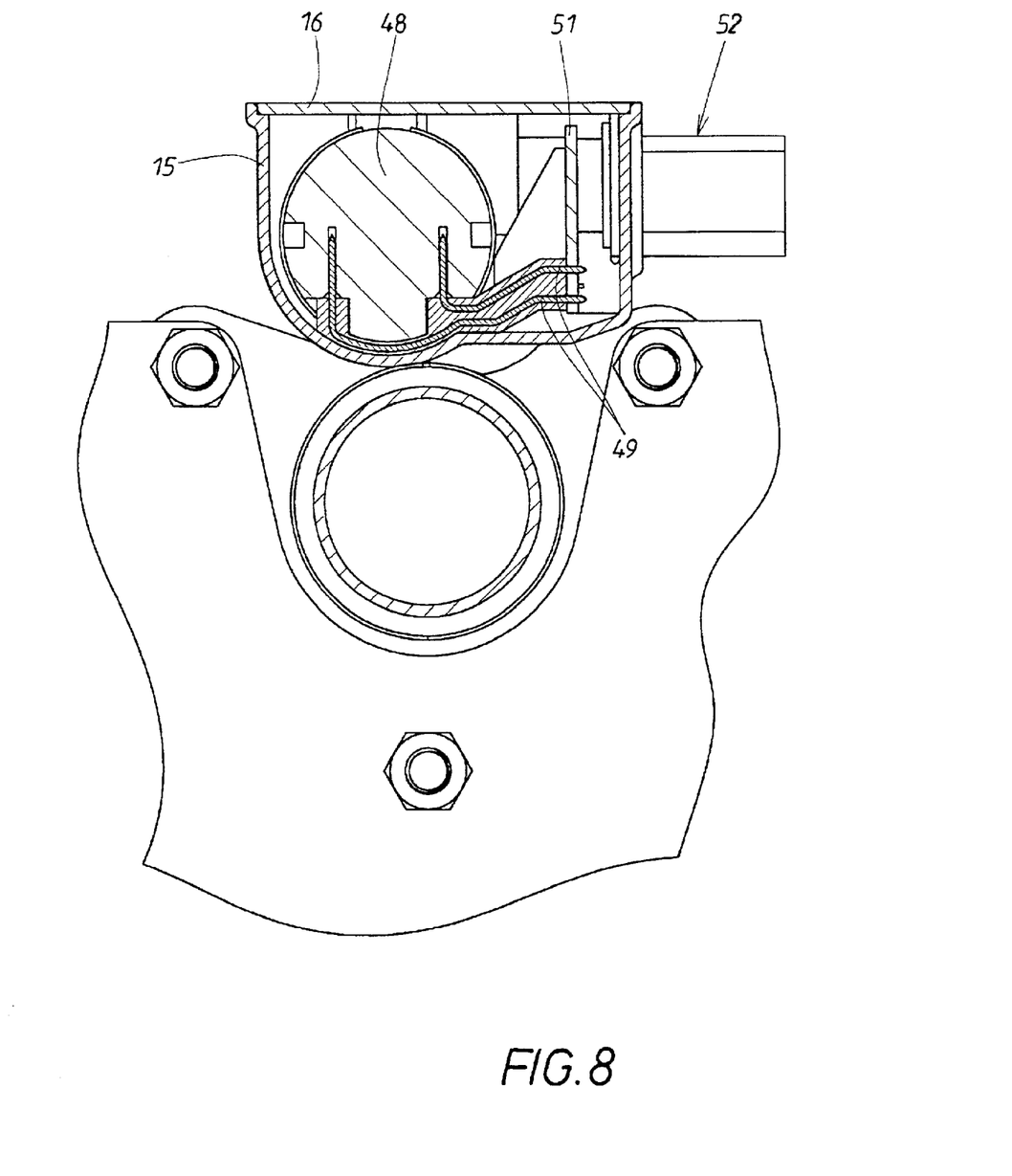
FIG. 8 shows a radial section in analogy to FIG. 7 along the section line VIII—VIII of FIG. 4.
Figure 9:
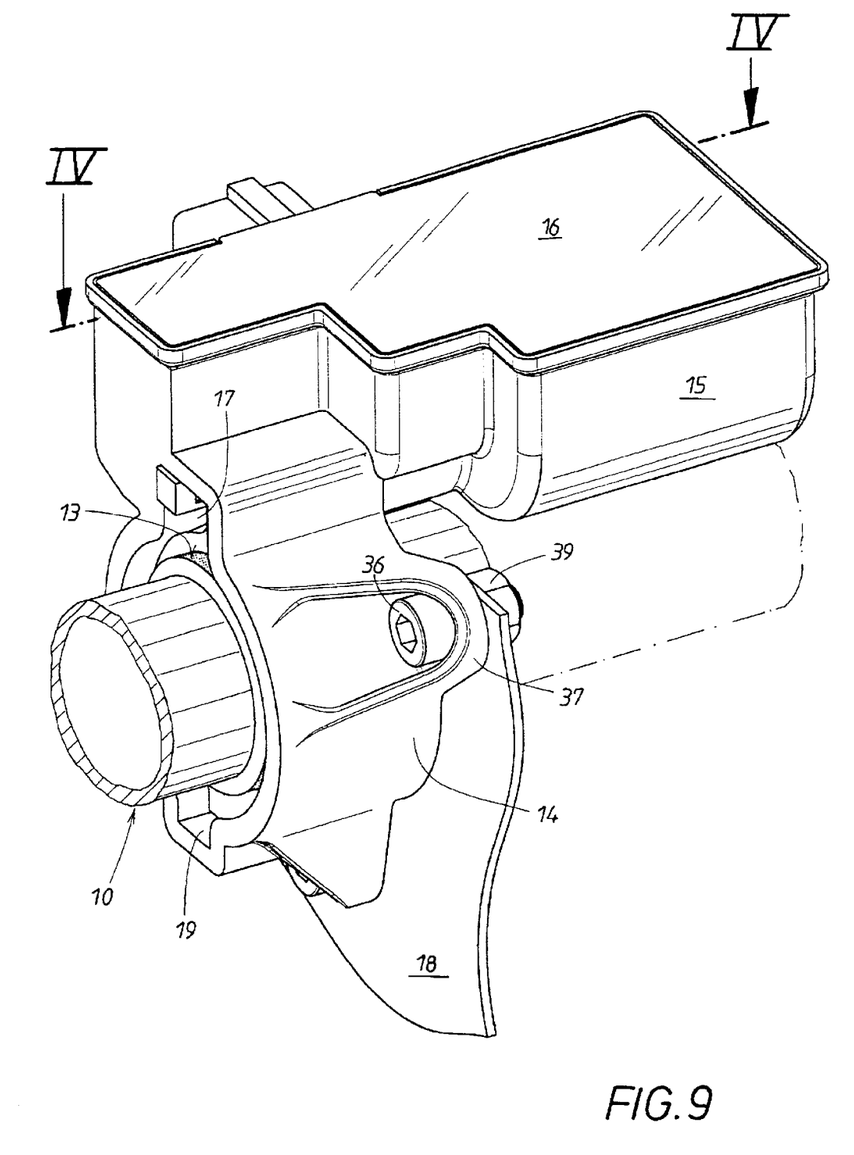
FIG. 9 is a perspective view analog to FIGS. 1 and 2 showing the device according to the invention after completion of assembly.

FIG. 8 shows contacting of the electric motor 58 with electrical lines 49 which extend away from certain electrical conductors of the printed board 51. Sensors 54, 55 determine the respective position of the wedge 40 and transmit this information to the relevant components of the control device 50. In the present case, the sensors are Hall sensors which cooperate with a permanent magnet 56 positioned in a transverse bore 35. In the inactive position 40.2 of the wedge, the permanent magnet 56, as indicated in FIG. 5, cooperates with the external sensor 55 which detects the aforementioned release position 20.2 and, when this position 20.2 has been reached, the motor 48 is stopped. The steering column 10 is released to allow steering of the vehicle.

In order to make the vehicle theft-proof, the control device 50 is actuated. This is realized, as is known in the art, by a suitable triggering mechanism. When actuating the vehicle with a mechanical key, triggering occurs when the key is brought within a correlated lock cylinder into a zero position and is then removed from the lock cylinder. Moreover, it is possible to use in this connection an electronic key which cooperates by means of transmitters with a suitable key receptacle and, upon removal of the key, effects triggering. In the case of an automatic transmission, it can be required to move the gear selector shaft into the P position. For authorizing the actuation of the control device, it is also possible to employ an identification card which can also be active from a distance. In this case, the aforementioned triggering of the control device is realized by a further action, for example, actuation of the door handle.

When in this way the control device is triggered, the control device 50 ensures that the electric motor 48 is switched on via the relay 53. The gear wheel 45 provided with the threaded receptacle 43 is then driven in the counterclockwise direction 57, when viewed in the viewing direction of FIG. 2, in the case that threads 42, 43 are right-hand threads. For such a rotation of the electric motor 48, the threaded member 42 is threaded into the threaded receptacle 43. The wedge 40 in FIG. 2 is moved by the travel stroke indicated at 59 into the position illustrated by a dash-dotted line; the end position is illustrated in FIGS. 1 and 4 in solid lines and indicated by the auxiliary line 40.1.

Figure 4:
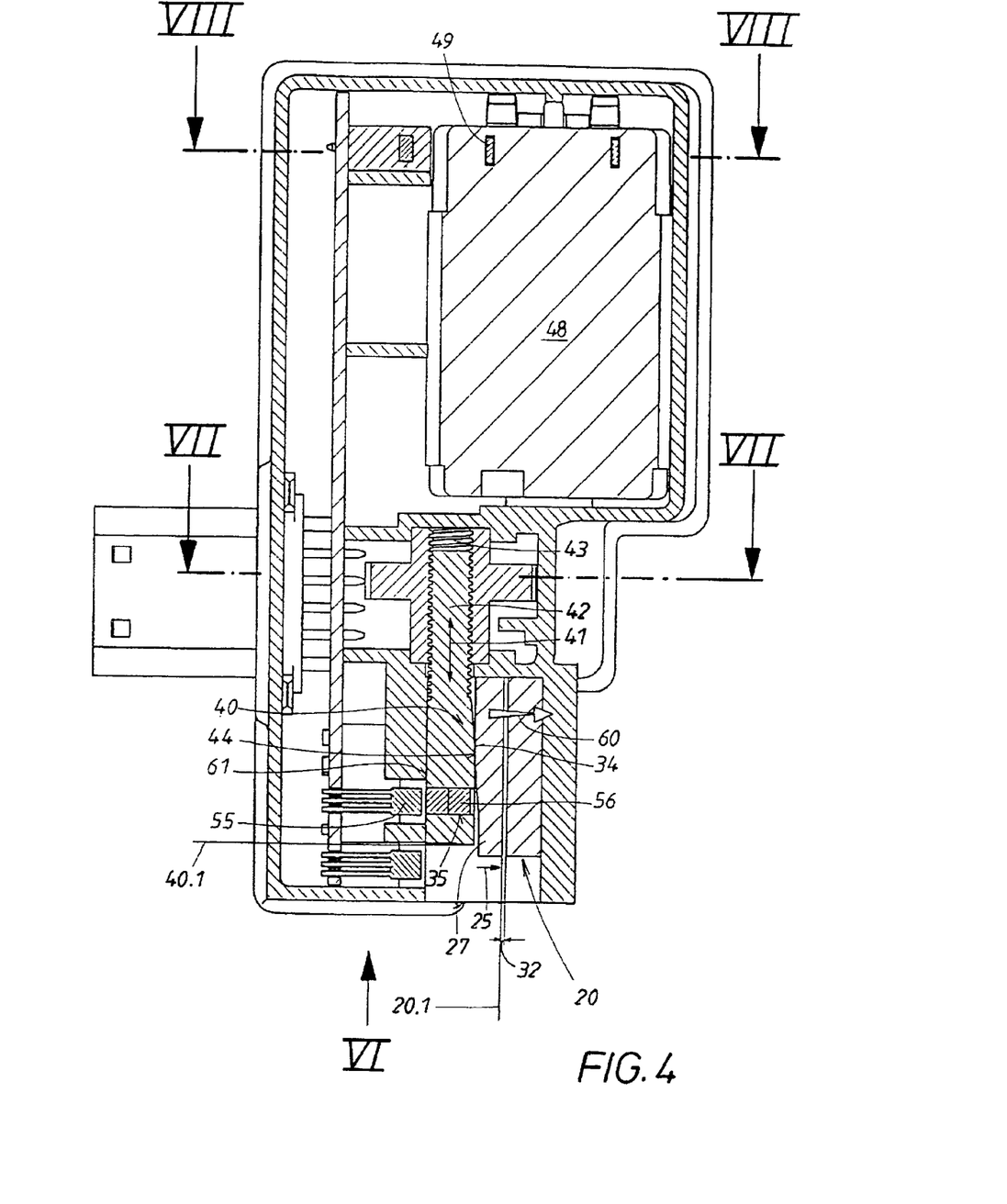
FIG. 4 shows on an enlarged scale a plan view onto an axis-parallel longitudinal section of the device, along the plane indicated at VI—VI in FIG. 9, in the locking situation as illustrated in FIG. 1.

This threading movement moves the wedge surface 44 onto the counter wedge surface 34 provided on the radial flange 27 of the clamping jaw 21 and reaches optionally also the substantially planar end member of the external flank, as illustrated in FIG. 4. The threaded member 42 has been threaded to the maximum extent into is threaded receptacle 43. The permanent magnet 56 located in the wedge 40 has reached the effective area of the inner Hall sensor 55 which then indicates this active position 40.1 to the control device 50. The control device 50, in turn, now turns off the motor 48 via the relay 53 and secures the position of the movable clamping jaw 51 shown in FIGS. 1 and 4.

As illustrated in FIG. 4, the wedge 40 has been guided during its longitudinal movement 41 with one longitudinal surface on the guide surface 61 which, in the present case, is substantially parallel to the axis of the steering column. The incline of the wedge surface 44 and counter wedge surface 34 ensures that the moveable clamping jaw 21 is forced against the other jaw by its radial end flange 27 in the direction of the already mentioned arrow 25. The gap between the two end flanges 27, 28 has been reduced to a minimal value 32 as seen in FIG. 4. The inwardly moved wedge 40 supported on its guide surface 61 exerts a clamping force which is illustrated by force arrow 60 in FIG. 4. The friction surfaces 23 of the two clamping jaws 21, 22 are thus frictionally secured on the counter friction surface 13 on the circumference of the steering column 10. The position of the clamp 20 illustrated by the axial auxiliary line 20.1 in FIG. 4 is the "locking position". The steering column 10 is blocked against rotation. The vehicle is protected against theft.

The transition of the device from the locking position 20.1 into the release position 20.2 is realized by reversal of the wedge 40 from its active position 40.1, as illustrated in FIGS. 1 and 4, into the inactive position 40.2, shown in FIGS. 2 and 5. This is realized again by the actuation of the triggering mechanism correlated with the control device 50 in connection with an authorization specific to the vehicle. This can be realized in any known way, for example, by mechanical or electronic keys and/or by identification cards and actuators. Based on the active position 40.1 of FIG. 1, the motor 48 is now oppositely supplied with current or a gear correlated with the motor is reversed so that now the gear wheel 45 containing the threaded receptacle 43 is rotated in the clockwise direction 58. The threaded member 42 is thus retracted from the threaded receptacle 43. The removal action of the wedge 40 is stopped when by means of the external sensor 54 the inactive position 40.2 of the wedge is determined. Since the wedge surface 44 has released the counter wedge surface 34, no clamping force 60 is active anymore. The release force 30, illustrated in FIG. 3, acting in the counter direction generates the described large gap 31 between the two jaw flanges 27, 28 which again results in the release gap 30 illustrated in FIG. 6.

As already mentioned, the travel strokes upon pressing action 25 and release action 24 of the two clamping jaws 21, 22 are minimal. They move between a clamping contact in the locking position 20.1, on the one hand, and the small play in the release position 20.2. With a corresponding transmission ratio of the gear 42, 47, the acting clamping force 60 can be increased to extremely high values even with weak motors 48. In both positions 20.1 and 20.2, a guiding action of the steering column 10 by means of the clamp 20 is practically realized. This guiding action can therefore also be used as a rotational bearing for the steering column 10. In this case, the locking device according to the invention has at the same time the function of a steering column bearing; this has been impossible in the case of prior art locking devices.

In the illustrated embodiment, the locking position 20.1 of the clamp 20 is achieved by the inserted active position 40.1 of the wedge 40. In this case, the wedge 40 presses only onto one outer flank 34 of the flange 27 of the moveable jaw 21. As an alternative, the outer flank of the flange 28 of the other clamping jaw 22 can be moved by the same control member in the opposite direction so that both clamping jaws exert oppositely directed clamping forces 60.

A further alternative resides in that in the active position a common wedge can be moved between the two clamping jaws 21, 22 in order to force them apart in the area of their end flanges 27, 28. In this case, the active position, contrary to the illustrated embodiment, would result in a release position of the two clamping jaws while, in reverse, the inactive position would result in the two clamping jaws being free in order to be pressed against one another by clamping forces acting on them in opposite directions. The steering column positioned between the two clamping jaws is then clamped and blocked by the clamping jaws being pressed against one another.

While specific embodiments of the invention have been shown and described in detail to illustrate the inventive principles, it will be understood that the invention may be embodied otherwise without departing from such principles.

What is claimed is:

1. A device for locking a steering column of a vehicle, comprising:
   a force-loaded locking member;
   a control device configured to adjust the locking member relative to the steering column between a locking position preventing rotation of the steering column and a release position allowing rotation of the steering column;
   wherein the locking member is comprised of one or more clamping jaws having a substantially smooth friction surface without a surface pattern;
   a substantially smooth counter friction surface without a surface pattern provided on the circumference of the steering column;

a force generator connected to the control device, wherein the force generator is configured to exert in a locking situation, where the locking member is in the locking position, a clamping force onto the locking member directed against the counter friction surface and is configured to turn off the clamping force in a release situation where the locking member is in the release position, the locking member being subjected to a constant release force counteracting the clamping force and acting to push the friction surface away from the counter friction surface.

2. The device according to claim 1, wherein the locking member is comprised of a pair of the clamping jaws, wherein the counter friction surface of the steering column is arranged between the pair of the clamping jaws, and wherein the pair of the clamping jaws is subjected to a release force forcing the pair of the clamping jaws apart and to a clamping force forcing the pair of the clamping jaws toward one another.

3. The device according to claim 2, wherein a first one of the clamping jaws of the pair is connected to a stationary support provided at a side of the first clamping jaw facing away from the steering column and is a stationary jaw, while a second one of the clamping jaws of the pair is configured to be movable towards the stationary jaw by the force generator and is a moveable clamping jaw.

4. The device according to claim 3, wherein the locking member is a clamp having two legs and wherein the pair of the clamping jaws is formed by the two legs of a clamp, wherein the clamp surrounds the steering column in the area of the counter friction surface.

5. The device according to claim 4, wherein the clamp has a hinge connecting the two legs to one another so as to pivotable relative to one another.

6. The device according to claim 4, wherein the clamp has a bending point connecting the two legs to one another, wherein the bending point generates a release force which, in the release situation, forces the friction surfaces provided on the legs of the clamp away from the counter friction surface of the steering column.

7. A The device according to claim 1, wherein the force generator comprises a guided wedge having at least one wedge surface, wherein the locking member has a single one of the clamping jaws provided with a flank or has two of the clamping jaws provided with a flank, respectively, wherein the wedge surface of the wedge is configured to be moved by the control device between an active position and an inactive position relative to the flank of the single clamping jaw or the flanks of the two clamping jaws.

8. The device according to claim 7, wherein the active position of the wedge is the locking position of the locking member and the inactive position of the wedge is the release position of the locking member.

9. The device according to claim 7, wherein the wedge is longitudinally guided between the inactive and active positions.

10. The device according to claim 9, wherein the longitudinal movement of the wedge is substantially parallel to an axis of the steering column.

11. The device according to claim 7, wherein the flank of the single clamping jaw has a counter wedge surface interacting with the wedge surface of the wedge.

12. The device according to claim 7, wherein the flanks of the two clamping jaws have a counter wedge surface, respectively interacting with the wedge surface of the wedge.

13. The device according to claim 7, wherein the wedge in the active position moves between the two clamping jaws, forces the two clamping jaws away from one another to transfer the two clamping jaws into the release position of the locking member, and wherein in the inactive position the wedge releases the two clamping jaws so that the two clamping jaws are forced by the clamping force against the counter friction surface of the steering column and moved into the locking position of the locking member.

14. The device according to claim 7, comprising a drive for moving the wedge, wherein the drive comprises a threaded member provided in the wedge and a threaded receptacle receiving the threaded member, wherein drive further comprises a motor and wherein the motor rotates the threaded receptacle for insertion and retraction of the engaged threaded member to effect the longitudinal movement of the wedge, wherein the motor is connected to the control device and switched on and off by the control device.

15. The device according to claim 14, wherein the drive further comprises a gear wheel and wherein the threaded receptacle is arranged in a hub area of the gear wheel, and wherein the motor cooperates with the gear wheel.

16. The device according to claim 7, wherein the wedge, the motor, and the gear form a unit positioned so as to be axis-parallel to the steering column with regard to movement and axes of the unit.

17. The device according to claim 7, further comprising a drive with a motor and sensors arranged along a movement path of the wedge, wherein the sensors detect the active, inactive, or active and inactive positions of the wedge and indicate the active or inactive position of the wedge to the control device, and wherein the control device based on the active or inactive position activates or deactivates the motor.

18. The device according to claim 17, further comprising indicators connected to the control device and activated or deactivated by the control device based on the active or inactive position of the wedge.

19. The device according to claim 17, wherein the sensors are two Hall sensors cooperating with a permanent magnet movable together with the wedge.

* * * * *